United States Patent
Casey et al.

(10) Patent No.: US 7,711,572 B2
(45) Date of Patent: May 4, 2010

(54) INSPECTING AND RELEASING GOODS AT A LAND, AIR, OR SEA BORDER

(75) Inventors: Lynn Ann Casey, Vienna, VA (US); Stephen David Lerner, Fairfax, VA (US)

(73) Assignee: Accenture, LLP, Palo Alto, CA (US)

( * ) Notice: Subject to any disclaimer, the term of this patent is extended or adjusted under 35 U.S.C. 154(b) by 1639 days.

(21) Appl. No.: 09/970,789

(22) Filed: Oct. 5, 2001

(65) Prior Publication Data
US 2003/0069738 A1 Apr. 10, 2003

(51) Int. Cl.
G06Q 30/00 (2006.01)
G06K 9/00 (2006.01)
(52) U.S. Cl. .......................................... 705/1; 382/103
(58) Field of Classification Search ...................... 705/1; 382/103
See application file for complete search history.

(56) References Cited

U.S. PATENT DOCUMENTS

| | | | |
|---|---|---|---|
| 5,592,561 A | 1/1997 | Moore | |
| 5,895,073 A | 4/1999 | Moore | |
| 6,218,943 B1 | 4/2001 | Ellenbogen | |
| 6,246,778 B1 * | 6/2001 | Moore | 382/103 |
| 6,438,577 B1 | 8/2002 | Owens | |
| 6,707,879 B2 * | 3/2004 | McClelland et al. | 378/57 |
| 2002/0049660 A1 * | 4/2002 | Obrador et al. | 705/37 |
| 2003/0023469 A1 * | 1/2003 | Lee et al. | 705/7 |

OTHER PUBLICATIONS

Search Report.
Computerized Customs Clearance Will Speed Cargo Transit, Aviation Week & Space Technology, Nov. 3, 1986, vol. 125, No. 18, p. 153.
Hi-tech mobile customs inspection vehicles arrive at Russian-Georgian border, BBC Monitoring International Reports, Dec. 28, 2000, 1 page.

* cited by examiner

*Primary Examiner*—Jamisue A Plucinski
(74) *Attorney, Agent, or Firm*—Banner & Witcoff, Ltd.

(57) ABSTRACT

A method and system for use by a Customs Agency for clearing shipments of goods into a country is disclosed. A customs resource application may be used to integrate alert information, news, research, and communications capabilities. Customs inspectors may use the resource application with a conventional computer, or with a portable device in the field as they perform customs inspections. The portable device provides access to alert information regarding shipments that are to be inspected by the inspector, and provides alert resolution capabilities so that the inspector can clear shipments into the country from the location of the inspection and/or shipped goods without requiring the inspector to return to a field office to clear the goods.

47 Claims, 13 Drawing Sheets

FIG. 2 e Inspector Portal — 203

Welcome Inspector Smith — 219
- Port: Laredo — 221
- Role: CET — 223

Icons: Alerts (209), Tools (211), Search (213), email (215), Internet (217)

Help | Logout — 225

I-NEWS (201)
- Customs discovered big drug shipment on vessels in Mexico
- WANTED: John Jones, International export of stolen vehicles
- Customs search for International narcotics smuggling hashish in Arizona
- Inspectors uncovered 203 drug shipment from Asia
- Cocaine found at the FedEx hub in Montana
- Cuban cigars are restricted merchandise
- Stop the money laundering in Iran
- Illegal plant from Taiwan introduced disease in America's food chain

RESEARCH (205)
- Address Search
- Vehicle Look-up
- Criss-Cross Directory
- Tag Report
- ACS
- Target Analysis
- Dun & Bradstreet
- Other Customs Systems Thursday, March 15, 2001

Tabs: Alerts | Alert Detail | Alert Resolution

Thursday, March 15, 2001 — 227

| Priority | Date of Arrival | Target | Commodity | R1 |
|---|---|---|---|---|
| High | 3/15/2001 | Js Supply | 8 Cylinder Engines | 95 |
| High | 3/15/3001 | SPL Steel | Scrap Metal | 85 |
| High | 3/15/3001 | Able Cargo | Galvanized Pipe | 80 |
| Medium | 3/16/3001 | Hasbo | Toys | 60 |
| Medium | 3/16/3001 | Birch Inc. | Chairs | 45 |
| Low | 3/16/3001 | Angle Ltd. | Ball Bearings | 25 |

Click to see more>> — 229

Inspections Look-up — 231
March ▼ 2001 ▼

| Su | Mo | Tu | We | Th | Fr | Sa |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

TAG REPORT — 233
- Fresh produce from Central America has been used to conceal cocaine over the last 6 months
- Last 3 weeks has shown a substantial presence of smuggling in gas tanks
- Increased level of heroin found in scrap metal during February

207 e Inspector Portal

Help | Logout

Alerts  Tools  Search  email  Internet

Thursday, March 15, 2001

235  237  239

| Alerts | Alert Detail | Alert Resolution |

Importer ID: BDXS79432104715    Arrival Date: 3/15/2001
Importer: Js Supply    Bill of Lading #: 123  — 243
Import Address: One Center Street
Dallas Texas 54930
Country of Departure: Brazil (Direct Route)
Broker: BRO
Commodity: 8 Cylinder Engines
Quantity: 120
Weight: 10 Tons
Declared Value: $9,450.00
Packaging: Container
Shipper: ITG Carrier
Shipper Address: 14 Oval Street
San Paulo, Brazil 175965
Risks: 1st time importer with suspect address
No case history available for importer Go To Bill of Lading AlertX-Ray Team  — 245

View digital image:

— 227

— 207

I-NEWS
- Customs discovered big drug shipment on vessels in Mexico
- WANTED: John Jones, International esport of stolen vehicles
- Customs search for International narcotics smuggling hashish in Arizona
- Inspectors uncovered 203 drug shipment from Asia
- Cocaine found at the FedEx hub in Montana
- Cuban cigars are restricted merchandise
- Stop the money laundering in Iran
- Illegal plant from Taiwan introduced disease in America's food chain

RESEARCH
- Address Search
- Vehicle Look-up
- Criss-Cross Directory
- TAG Report
- ACS
- Target Analysis
- Dun & Bradstreet
- Other Customs Systems

FIG. 4 e Inspector Portal

Help | Logout —225

Alerts  Tools  Search  email  Internet

Thursday, March 15, 2001

235  237  239
Alerts | Alert Detail | Alert Resolution

Findings: Dogs did not find odor. Insert note in importer history that packaging did not confirm standards. Further review of carrier may be necessary —227

Type of Examination: Exam Covered 75% of vehicle
Special Tools: No special tools needed
Action: Re-examine Import for contraband
Risk Code: 95

Comments:

Save    Clear    Close Alert

Follow up Needed: ☐
Approval: ☐

Route Report to: Office of Intelligence
Office of Investigation
Trade Operations
Office of Intelligence...
ICAT 253
251

I-NEWS
- Customs discovered big drug shipment on vessels in Mexico
- WANTED: John Jones, International esport of stolen vehicles
- Customs search for international narcotics smuggling hashish in Arizona
- Inspectors uncovered 203 drug shipment from Asia
- Cocaine found at the FedEx hub in Montana
- Cuban cigars are restricted merchandise
- Stop the money laundering in Iran
- Illegal plant from Taiwan introduced disease in America's food chain

RESEARCH
- Address Search
- Vehicle Lock-up
- Criss-Cross Directory
- TAG Report
- ACS
- Target Analysis
- Dun & Bradstreet
- Other Customs Systems

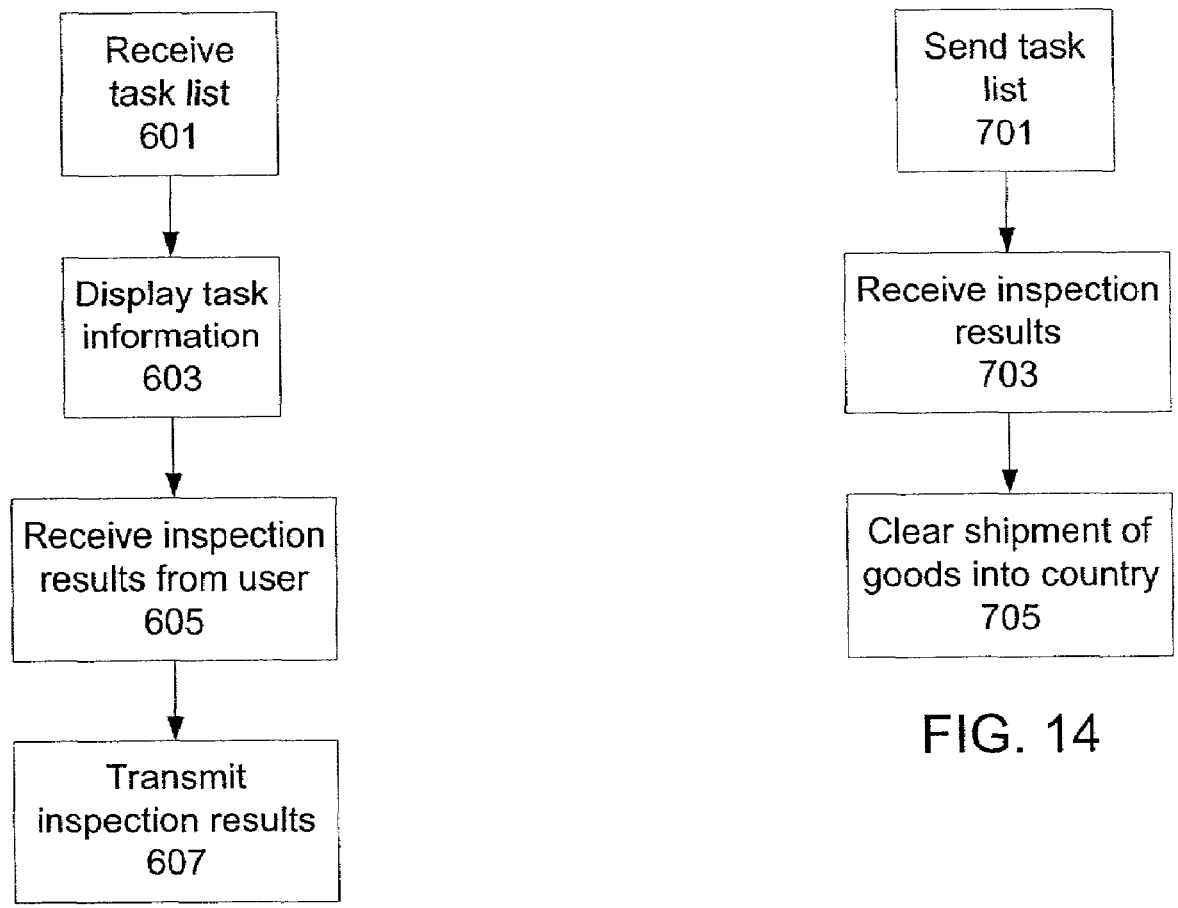

INSPECTING AND RELEASING GOODS AT A LAND, AIR, OR SEA BORDER

FIELD OF THE INVENTION

The invention relates to a data tracking method and system. The invention may be embodied in systems and methods used by customs inspectors to track and release shipments at borders using a database and a remote terminal.

BACKGROUND OF THE INVENTION

The United States Customs Service (USCS) is one of the primary enforcement agencies monitoring U.S. borders. The Customs Service's responsibilities include, for each of the country's approximately 330 borders, ensuring that illegal goods do not enter the country, and ensuring that legal goods enter the country only after proper inspection and/or approval.

On an annual basis, the USCS is presently responsible for inspecting and approving millions of shipments coming into the U.S., including shipments by air, land, and sea. This is presently done using a largely manual paper-based process. Due to the number of items entering the U.S., only about 1-5% of all shipments are searched. On a daily basis, customs inspectors receive lists of tasks that they must perform. The tasks include alerts to shipments that are to be visually inspected, and alerts to types of shipments that have recently been found to contain illegal goods, such as drugs. The tasks are printed on sheets of paper that the customs inspectors carry with them on clipboards when they perform inspections.

The USCS presently uses a mainframe computer to house a central database, referred to as the Automated Commercial System, or ACS. A typical method used by the USCS to perform inspections is shown in FIG. 10. Each field office generally has at least one computer through which the inspectors can connect to and log in to the central mainframe ACS system, in step 401. The inspector receives and prints a list of tasks for the day (e.g., inspections) in step 403. The inspector then takes the list printout on a clipboard to inspect the goods at the goods' location (e.g., a loading dock) in step 405. Upon completion of the inspection, the inspector must, in step 407, perform any necessary research, enter the inspection findings, and clear the shipment for import. Step 407 is performed at the field office, not the inspection location. That is, the release decision regarding the shipment is physically made from the field office. Finally, in step 409, the central database ACS system issues clearance information (e.g., an authorization code) that the shipper may use to bring the goods into the U.S. The clearance information is typically transmitted to shippers via electronic data interchange (EDI). The shipper may then use the clearance information to obtain the goods and continue their transport within the U.S.

The amount of data entry presently associated with each shipment can be lengthy and tedious. As a result, customs inspectors often wait until several shipments' data are ready to be entered into the database before clearing the shipments. This often delays clearance of shipments for hours, and sometimes even longer.

During inspection, questions may arise regarding a shipment for which the inspector must perform research. The research may be performed before the search has begun, when the alert provides some information to the inspector that the inspector wants to investigate. The research may also be performed after the inspection where the inspection gives rise to the researchable issue. For instance, an inspector may travel to a seaport to perform an inspection for incoming engine blocks being shipped to an auto manufacturer. Upon inspecting the engine blocks in more detail, the inspector may realize that the engine blocks originate from a certain country or are of a certain configuration for which there is an alert, or that the engine blocks are made in a certain manner that makes them likely containers for drugs. Presently, the inspector must travel back to the field office to perform research on the engine block. Research materials available to each inspector include computer-based research tools, books, and the knowledge of other inspectors. The computer-based research tools, however, are not integrated. That is, the inspector may use one application program to perform some research and may use another application program to perform other research. Upon completing research at the field office, the inspector often then must travel back to the border where the search is being performed, in this instance the seaport, and finish the inspection before determining the goods' entry status. This can significantly delay the entry of the goods into the U.S.

Shipments can also be delayed by being misclassified. That is, each type of goods is given a classification, such as "4-cylinder engine," "6-cylinder engine," "8-cylinder engine," and the like. The amount of duty that a company must pay when the goods enter the U.S. depends in part on the classification. When goods are incorrectly classified, the wrong duty may be paid, or the shipment may be delayed so that a USCS import specialist can travel to the goods' location and reclassify the goods. Classifications often contain minor differences, such as "ink roller ball pen" vs. "ink ball-point pen," so misclassification is not uncommon. In addition, because some borders are located over one hour from the nearest import specialist, misclassification can cause lengthy delays.

In today's global economy, companies are increasingly dependent on international shipments of goods. For instance, an auto manufacturer may have to shut down one or more of its U.S. manufacturing plants if its shipments are delayed at a border for more than one hour. Thus, improved methods and systems are needed that allow customs inspectors to work more efficiently, and selectively search shipments based on better informed decisions.

It would be an improvement in the art if customs inspectors could clear shipments for entry into the country at the place of inspection, without the need to return to a field office. It would also be an improvement if customs inspectors could utilize a single computer to receive task information, perform research, receive news, communicate with other inspectors and import specialists, and clear shipments into the country. It would be a further advancement in the art if the single computer were portable and could be used in the field at a location where inspectors inspect shipments of goods.

BRIEF SUMMARY OF THE INVENTION

In a first aspect of the invention, there is a method of clearing a shipment of goods into a country. The method includes a set of steps. A client computer received a task list from a server computer. A customs inspector inspects a shipment of goods corresponding to one of the tasks in the task list. The customs inspector, at a location of the inspection, inputs inspection results into the client computer, and then the inspection results are sent to the server computer over a wireless communications link.

In a second aspect of the invention, there is a portable device that includes a display screen a processing unit, and memory. The memory stores computer readable instructions that, when executed by the processor, cause the portable device to perform a set of steps. The portable device receives a task list from a computer, wherein each task corresponds to a shipment of goods at a port. The portable device displays task information on the display screen. The portable device receives inspection results from a user, wherein the inspection results correspond to one of the shipments of goods in the task list, and sends the inspection results to the computer. The inspection results are sent over a wireless communications link.

In a third aspect of the invention, there is a computer including a display screen a processing unit, and memory. The memory stores computer readable instructions corresponding to a single software application. When the processor executes the computer readable instructions, the computer performs a set of steps. The computer receives a task list from a second computer, wherein each task corresponds to a shipment of goods at a port, and displays task information on the display screen. The computer receives inspection results from a user, wherein the inspection results correspond to one of the shipments of goods in the task list, and the computer sends the inspection results to the second computer.

In a fourth aspect of the invention, there is a portable device including a display screen, a processing unit, and memory. The memory stores computer readable instructions that, when executed by the processor, cause the portable device to perform a set of steps. The portable device receives a task list from a computer, wherein each task corresponds to a shipment of goods at a port, and displays a task summary list on the display screen. For each task the device displays a priority level, an arrival date, an importer name, a risk level, and a commodity name. The portable device displays detailed task information on the display screen, wherein the task information includes information associated with a shipment of goods corresponding to a selected task. The portable device receives inspection results from a user, wherein the inspection results correspond to the shipment of goods, and sends the inspection results to the computer over a wireless communications link.

In a fifth aspect of the invention, there is a computer including a display screen, a processing unit, and memory. The memory stores computer readable instructions corresponding to a single software application. When the processor executes the computer readable instructions, the computer performs a set of steps. The computer receives a list of tasks from a central database, wherein each task corresponds to a shipment of goods at a port, and displays a task summary list on the display screen wherein, for each task, the computer displays a priority level, an arrival date, an importer name, a risk level, and a commodity name. The computer displays detailed task information on the display screen, wherein the task information comprises information associated with a shipment of goods corresponding to a selected task. The computer receives inspection results from a user, wherein the inspection results correspond to the shipment of goods, and the computer sends the inspection results to the central database to clear the shipment for passage.

BRIEF DESCRIPTION OF THE DRAWINGS

FIG. 2 illustrates a computer screen displaying alert summaries in a content area, according to one embodiment of the invention.

FIG. 3 illustrates a computer screen displaying alert detail information in a content area, according to one embodiment of the invention.

FIG. 4 illustrates a computer screen displaying alert resolution information in a content area, according to one embodiment of the invention.

FIG. 13 illustrates a flowchart for performing a method according to an embodiment of the invention.

FIG. 14 illustrates a flowchart for performing a method according to an embodiment of the invention.

DETAILED DESCRIPTION OF THE INVENTION

Aspects of the invention may be embodied in various devices and architectures. One aspect of the invention provides a computing device in communication with a central database that a customs inspector may use to perform each task that is part of her daily routine. Application software on the adapted computing device operated in combination with the database may be referred to as a customs resource application.

Figure 12:
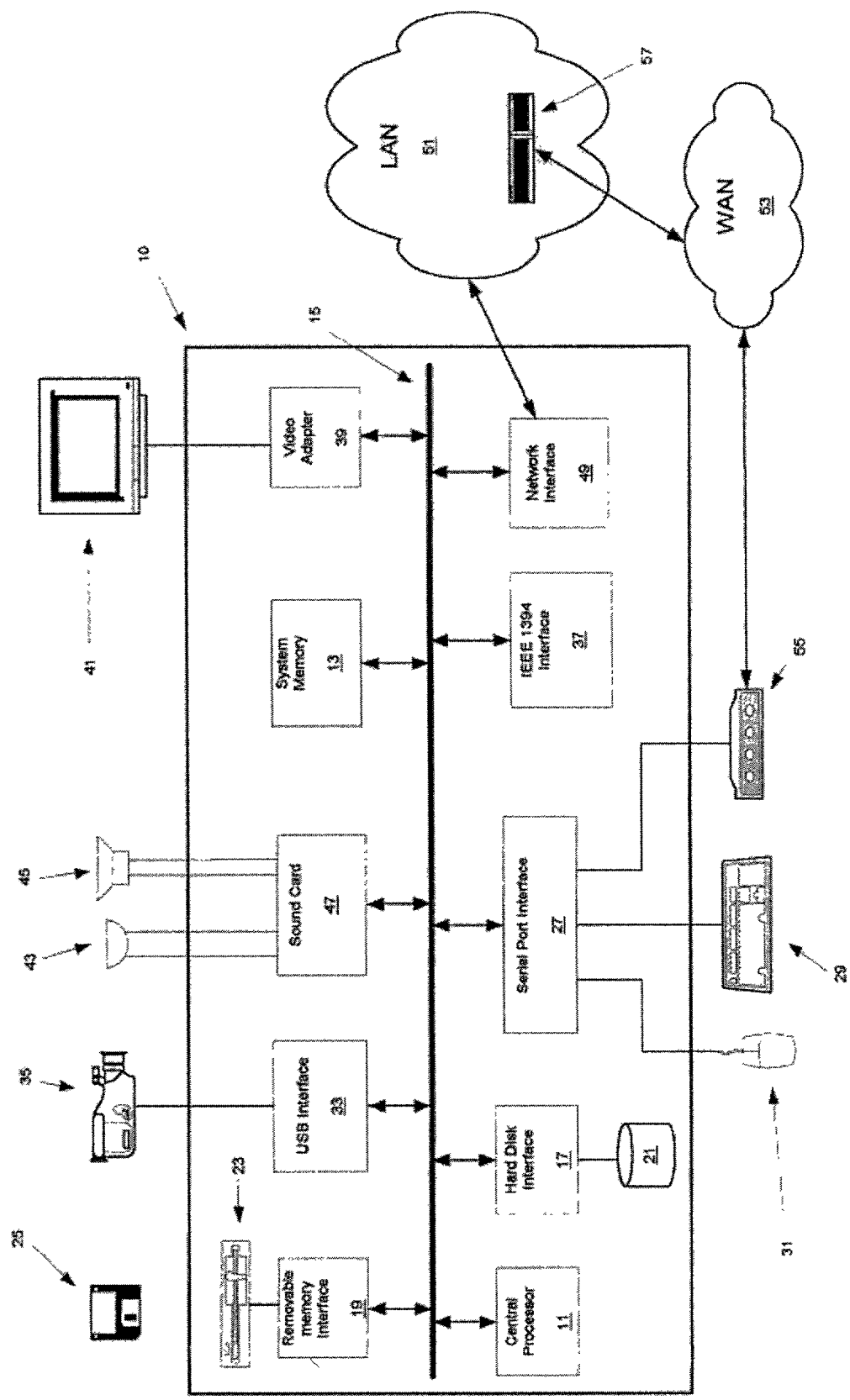
FIG. 12 illustrates a computer/network block diagram for use with an embodiment of the invention.

The methods and systems of the present invention may be embodied in a computer system, such as a computer system 10 shown in FIG. 12. The computer system 10 includes a central processor unit 11, a system memory 13 and a system bus 15 which couples various system components, including the system memory 13, to the central processor unit 11. The system bus 15 may comprise one of any of several types of bus structures, including a memory bus or memory controller, a peripheral bus, or a local bus using any of a variety of bus architectures. The structure of the system memory 13 is well known to those skilled in the art and may include a basic input/output system (BIOS) stored in a read only memory (ROM), and one or more program modules, such as operating systems, application programs, and program data, stored in random access memory (RAM).

The computer system 10 may also include a variety of interface units and drives for reading and writing data. In way of example, the computer system 10 may include a hard disk interface 17 and a removable memory interface 19, coupling a hard disk drive 21 and a removable memory drive 23, respectively, to the system bus 15. The removable memory drive 23 may include a magnetic disk drive or an optical disk drive. The drives for reading and writing data, and their associated computer-readable media, such as a floppy disk 25, provide nonvolatile storage of computer readable instructions, data structures, program modules and other data for the computer system 10. It should be understood that, although only one hard disk drive 21 and one removable memory drive 23 are shown for clarity of illustration, the computer system 10 may include several of either or both such drives. Furthermore, the computer system 10 may include additional drives for interfacing with other types of computer-readable media.

A user can interact with the computer system 10 using a number of input devices. In the illustration provided, a serial port interface 27 couples a keyboard 29 and a pointing device 31 to the system bus 15. The pointing device 31 may be implemented as a mouse, a track ball, a pen device, or other such similar device. Of course, one or more other input devices (not shown) such as a joystick, a game pad, a satellite dish, a scanner, a touch sensitive screen, or the like, may be connected to the computer system 10.

The computer system 10 may include additional interfaces for connecting still more devices (not shown) to the system bus 15. A universal serial bus (USB) interface 33 couples a video or digital camera 35 to the system bus 15. An IEEE 1394 interface 37 may be used to couple additional devices (not shown) to the computer system 10. Furthermore, the IEEE 1394 interface 37 may be configured to operate with particular manufacture interfaces, such as FireWire developed by Apple Computer and i.Link developed by Sony Corporation. Input devices may also be coupled to the system bus 15 through a parallel port, a game port, a PCI board, or any other interface used to couple and input device to a computer.

The computer system 10 may also include a video adapter 39 coupling a display device 41 to the system bus 15. The display device 41 may include a cathode ray tube (CRT), a liquid crystal display (LCD), a field emission display (FED), a plasma display, or any other device that produces an image that is viewable by the user. Additional output devices, such as a printing device (not shown), may be connected to the computer system 10.

Sound can be recorded and reproduced with a microphone 43 and a speaker 45. A sound card 47 may be used to couple the microphone 43 and the speaker 45 to the system bus 15. One skilled in the art will appreciate that the particular device connection configuration is shown for illustration purposes only, and that several of the peripheral devices could be coupled to the system bus 15 via alternative interfaces. For example, the video camera 35 could be connected to the IEEE 1394 interface 37, and the pointing device 31 could be connected to the USB interface 33.

The computer system 10 can operate in a networked environment using logical connections to one or more remote computers or other devices, such as a server, a router, a network personal computer, a peer device or other common network node, a wireless telephone, or a wireless personal digital assistant. The computer system 10 includes a network interface 49 that couples the system bus 15 to a local area network (LAN) 51. Networking environments are commonplace in offices, enterprise-wide computer networks, and home computer systems.

A wide area network (WAN) 53, such as the Internet, can also be accessed by the computer system 10. A modem unit 55 is shown connected to the serial port interface 27 and to the WAN 53. The modem unit 55 may be located within or external to the computer system 10, and may comprise any type of conventional modem, such as a cable modem or a satellite modem. The LAN 51 may also be used to connect to the WAN 53 via a router 57 in accordance with conventional practices.

It will be appreciated by one skilled in the relevant art that the network connections shown are exemplary and that other ways of establishing a communications link between computers can be used. The existence of any of various well-known protocols, such as TCP/IP, Frame Relay, Ethernet, FTP, HTTP, and the like, is presumed, and the computer system 10 can be operated in a client-server configuration to permit a user to retrieve web pages from a web-based server. Furthermore, any of various conventional web browsers can be used to display and manipulate data on web pages.

The operation of the computer system 10 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based, or programmable consumer electronics, network PCS, minicomputers, mainframe computers, personal digital assistants, and the like. Furthermore, the invention may also be practiced in distributed computing environments where tasks are performed by remote processing devices that are linked through a communications network. In a distributed computing environment, program modules may be located in both local and remote memory storage devices.

Figure 1:
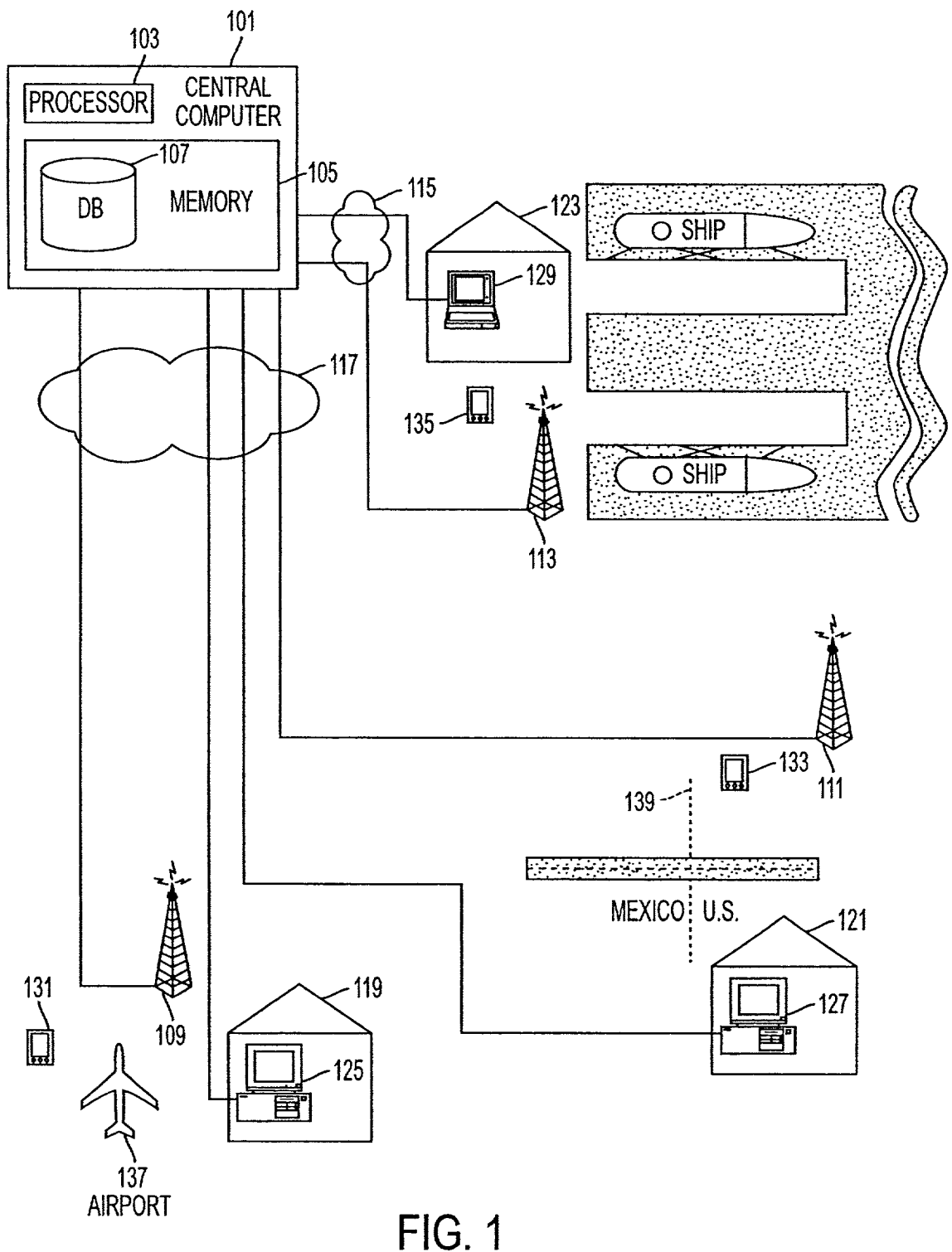
FIG. 1 illustrates a system architecture according to one embodiment of the invention.

A first embodiment of the invention will now be described with reference to FIGS. 1-4. FIG. 1 shows a system architecture of a computer network that may be used in this embodiment. Other network architectures are also possible. A central computer 101 may include a processing unit 103 and memory 105. The memory may be used to store a central database 107. Wireless communications towers 109, 111, and 113, and computers 125, 127, and 129, may each be communicatively coupled to the central computer 101 via one or more networks 115 and 117. Each field office 119, 121, and 123 may house one or more computers 125, 127, and 129. Mobile devices 131, 133, and 135 may wirelessly communicate with the central database through one or more of the wireless communication towers.

Each customs field office is typically located near a port (i.e. an international border) such as airport 137, a land border such as U.S.-Mexico border 139, or a sea border such as seaport 141. However, field offices are not necessarily located near a border location.

Computers 125, 127, and 129 may be any type of computing device that may be adapted to perform in accordance with the invention. Conventional desktop and laptop computers are only two examples of types of computers that may be used with the invention.

Portable devices 131, 133, and 135 may be any type of portable device adapted to perform in accordance with the invention, as further described below. Portable devices that may be used include, but are not limited to, a personal digital assistant adapted with wireless communication capabilities, such as a HANDSPRING VISOR using a HANDSPRING MODEM or VISORPHONE, or a PALM VII, both of which are commercially available and known in the art. Each portable device may also be a custom made portable device created for use with the invention, similar to a custom wireless portable device as used by UPS and FEDEX delivery personnel. Another example of a portable device that may be used with the invention is a palmtop computer, such as a Sony VAIO C1 PictureBook, model C1VN. It should be readily apparent to those skilled in the art that any variety of portable devices, whether known or later developed, may be adapted for use with the invention as described herein.

Each field office computer 125, 127, and 129 and each portable device 131, 133, and 135 may provide the same functionality, using two separate user interfaces. A first user interface, shown in FIGS. 2-4, may be used in field office computers, while a second user interface, shown in FIGS. 5-9, may be used in portable devices. Alternatively, the same user interface can be used on both types of devices.

In a first embodiment of the invention, an inspector may log in to the customs resource application from a client computer 125, 127, or 129 in a field office. Each client computer 125, 127, and 129 may be a desktop, laptop, or other conventional computer, and may store application software that, when executed by one or more processors within the client computer, causes the computer to perform in accordance with the invention as described herein. When the inspector logs in to the customs resource application, the client computer that the inspector is using may download information corresponding to the inspector from the central database 107. This information typically includes the inspector's name, port, role, and the inspector's present list of tasks. Each task, referred to as an alert, may correspond to an incoming shipment of goods that the inspector must inspect, typically at the shipment's point of entry into the U.S. Other information may also be downloaded from the central database.

After logging in, a customs resource application screen 201, shown in FIG. 2, is displayed on the display screen. The screen may be divided into three primary sections: header 203, research area 205, and content area 207. The header may display the inspector's name 219, port 221, and role 223, and may also contains links to the primary resources that a customs inspector uses during her daily routine, such as links to alerts 209, tools 211, search 213, email 215, and Internet 217. The port may be one of the approximately 330 borders that the USCS is responsible for monitoring, and the role may be the inspector's role within the Customs Service. In FIG. 2, the role "CET" designates that the inspector is part of the Customs Enforcement Team. In some embodiments, the header menu 203 is visible on each screen of the field office user interface. In other embodiments, the header menu may change from screen to screen, depending on user needs and the presently displayed screen, or may not be displayed at all.

The research area 205 contains information and research tools that the inspector may use while performing research on various shipments of goods. Research tools include address searching, vehicle ID/VIN lookup, Criss-Cross Directory, Trend Analysis Group (TAG) Reports, Automated Commercial System (ACS) access, Target Analysis, Dun & Bradstreet, and the like. The above are merely examples of types of tools that may be accessible in the research area. Other tools may also be included, as should be readily apparent to those skilled in the art.

The address searching may be used to look up an address, such as an incoming carrier's business address, an incoming motorist's home address on his or her driver's license, and the like. The vehicle look up may be used to find out information regarding a vehicle based on the Vehicle Identification Number (VIN) or other identifying information, such as a license plate number. The Criss-Cross directory may also be used to obtain vehicle information. A Criss-Cross directory is a research tool that allows inspectors to link a vehicle to a person, address, etc. It can be used to verify that the driver of the car is actually the owner or can determine where the vehicle was purchased. The Criss-Cross system may utilize a centralized database shared by multiple law enforcement agencies.

The USCS Trend Analysis Group, or TAG, prepares and makes available to inspectors, information regarding recent trends that the USCS has identified. TAG Reports generally relate to incoming shipments of illegal goods or the methods used by smugglers to attempt to bring illegal goods into the country. ACS may be used to access the USCS mainframe database system 101. Using ACS, the inspector can log directly in to the central database 107, and review raw data stored in the database without using the customs resource application's user-friendly interface.

Target Analysis is another enforcement tool that allows inspectors to obtain a risk rating related to a specific shipment based on various criterion. This criterion may include importer information, carrier information, type of merchandise, amount of times the carrier has been inspected, amount of times contraband has been found for a particular carrier, and the like. This information may be used by the inspector during the inspection process. A link to Dun & Bradstreet may also be provided so that inspectors can perform research on corporate entities. Other embodiments of the invention may also provide links to additional resources that inspectors use.

Information in the Research Section may include news articles to provide inspectors with up to date information to make more informed decisions during the inspection process. News articles may be news articles internal to the USCS, articles contained in press releases released by the USCS, or they may also be an instant message sent by an inspector who encounters a major source of contraband that may be of interest to other inspectors. Other types of news articles may also be included, such that inspectors receive information relevant to the inspection process.

The content area 207 may contain the content for the selected item from the header 203. FIG. 2 shows the content associated with the alerts link 209. In this embodiment, alert information as shown in FIG. 2 may be the default content when an inspector logs in to the customs resource application. In other embodiments, other default content screens may be used.

The TAG Report window 233 contains information similar to that which may be displayed upon selecting the TAG Report link/button in the research area. TAG Report headlines or titles may be displayed in the window 233. Each report may be selected by the inspector, at which time the system may display the complete TAG Report selected.

The inspection look up calendar 231 may be used to locate shipments by date. After selecting a requested month using the month and year pull down menus, the inspector may select a specific day of that month for which information is requested. After selecting a day of a specific month, a listing of shipments that either arrived on that day or that were cleared on that day may be displayed (not shown). The shipments may be sorted by status (e.g., arrived or cleared), displayed in alphabetical order, or displayed in any other predefined or user-defined manner. In other embodiments, shipments meeting other criteria may also be displayed as a result of using the Inspections Look-Up calendar. For instance, one embodiment may display only those shipments that were inspected on the selected day.

The content area 207 also includes an alert information window 227 with scroll button 229 when needed. The alert information window 227 may include three tabs: alerts tab 235, alert detail tab 237, and alert resolution tab 239. The alerts tab 235 may display an overview of identifying information for the alerts on the inspector's current task list. The information included under the alerts tab may include each alert's priority level, date of arrival into the U.S., target location or recipient organization, commodity, and risk index indicator level, each as received and defined by the USCS. If the inspector has more alerts than will fit in one screen of the alert information window, optional button 229 may be displayed. Clicking button 229 may scroll the alert information list one screen within the alert information window.

Upon selecting the alert detail tab 237, or by selecting an item within an alert, the system may enlarge and/or redisplay the alert information window 227 containing detailed information for the selected alert, such as is shown in FIG. 3. FIG. 3 depicts a customs resource application screen where the content area 207 includes an enlarged alert information window displaying an alert detail. The alert detail includes detailed information available regarding the specified alert, including information such as Importer ID, Importer Name, Importer Address, Country of Departure, Broker, Commodity, Quantity, Weight, Declared Value, Packaging, Shipper, Shipper Address, Risks, Arrival Date, Bill of Lading Number, a digital image when available, and the like. Additional or lesser information may be included under the alert detail tab. The purpose of the alert detail tab is to give the inspector relevant information regarding the selected alert.

Some embodiments may include a link 243 to the Bill of Lading and/or a link 245 to alert the USCS X-ray team. By selecting link 243, the Bill of Lading is displayed on the display screen. By selecting link 245, the X-ray team is notified, by sending a message to a computing device associated with the X-ray team, that the present shipment needs to be X-rayed before it is cleared into the U.S. The notification may be sent via email, instant message, text to voice, or using any other known communication technology.

When the inspector clicks or selects the alert resolution tab 239, the customs resource application screen 201 may redisplay the content area 207 including an alert resolution form shown in the alert information window 227 in FIG. 4. The content area may also contain a second window 251 through which an inspector with supervisory status may approve the alert clearance or request a follow up to the inspection.

The inspector may enter the inspection results in the alert resolution form. If the inspector has supervisory status, second window 251 may also be displayed so that the inspector can approve the alert approval or request a follow up, as well as optionally route a copy of the alert resolution report to another office within the USCS. When the inspector completes and saves the report, the information may be automatically transmitted to the central database 107. The inspector may then select the alerts tab 235 to view the remaining alerts on her list of tasks.

With reference to FIG. 1 and FIGS. 5-9, in a second embodiment of the invention, the inspector may log in to the customs resource application using portable device 131, 133, and 135, replacing the conventional paper and clipboard model that inspectors have previously used in the field. Each portable device 131, 133, and 135 may store application software that, when executed by one or more processors within the portable device, cause the portable device to perform in accordance with the invention as described herein. In some embodiments, the portable device may be adapted with wireless communication capabilities. Wireless communications may be accomplished using any technology presently known or hereinafter developed. The specific technology used is secondary to enabling the device with wireless communications capabilities. For instance, wireless communications may be performed using the USCS's secure telecommunications network, presently used for voice communications among Customs officials. Wireless communications may also be all performed using other known technologies, such as GSM, CDMA, AMPS, and the like. The portable device may wirelessly communicate with any one of communications towers 109, 111, and 113, which in turn relays the communications to and from the central computer 101 and more specifically to and from database 107.

Figure 5:
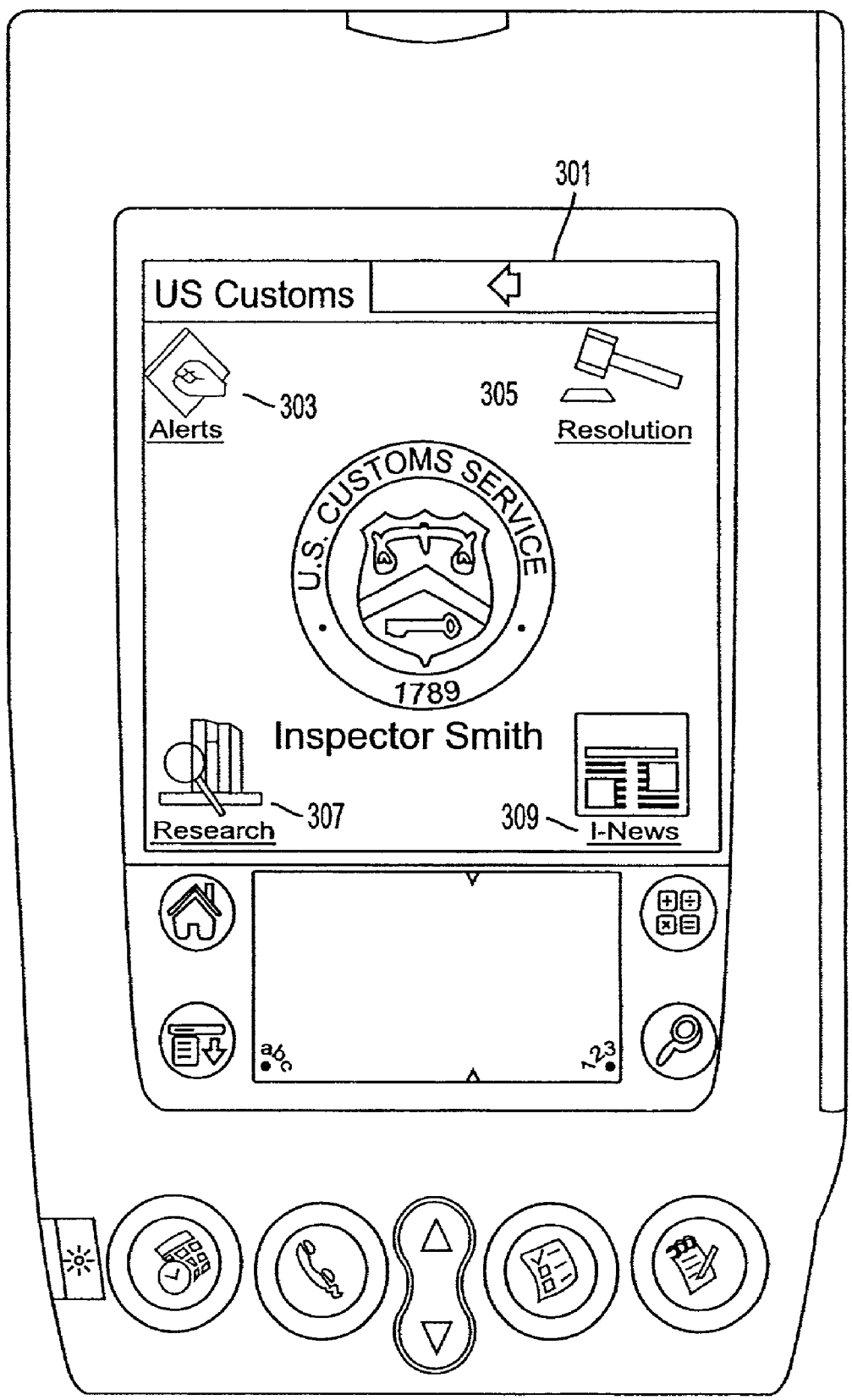
FIG. 5 illustrates a computer welcome screen on a handheld device according to one embodiment of the invention.

After logging in to the customs resource application on the portable device, the device may display a welcome screen 301, as shown in FIG. 5. The welcome screen may display the inspector's name and provide a menu containing links 303, 305, 307, and 309 to various resources available to the inspector, including alerts, resolutions, research, and news, respectively. Links to other areas may optionally be included, such as a link to email or instant messaging.

Figure 6:
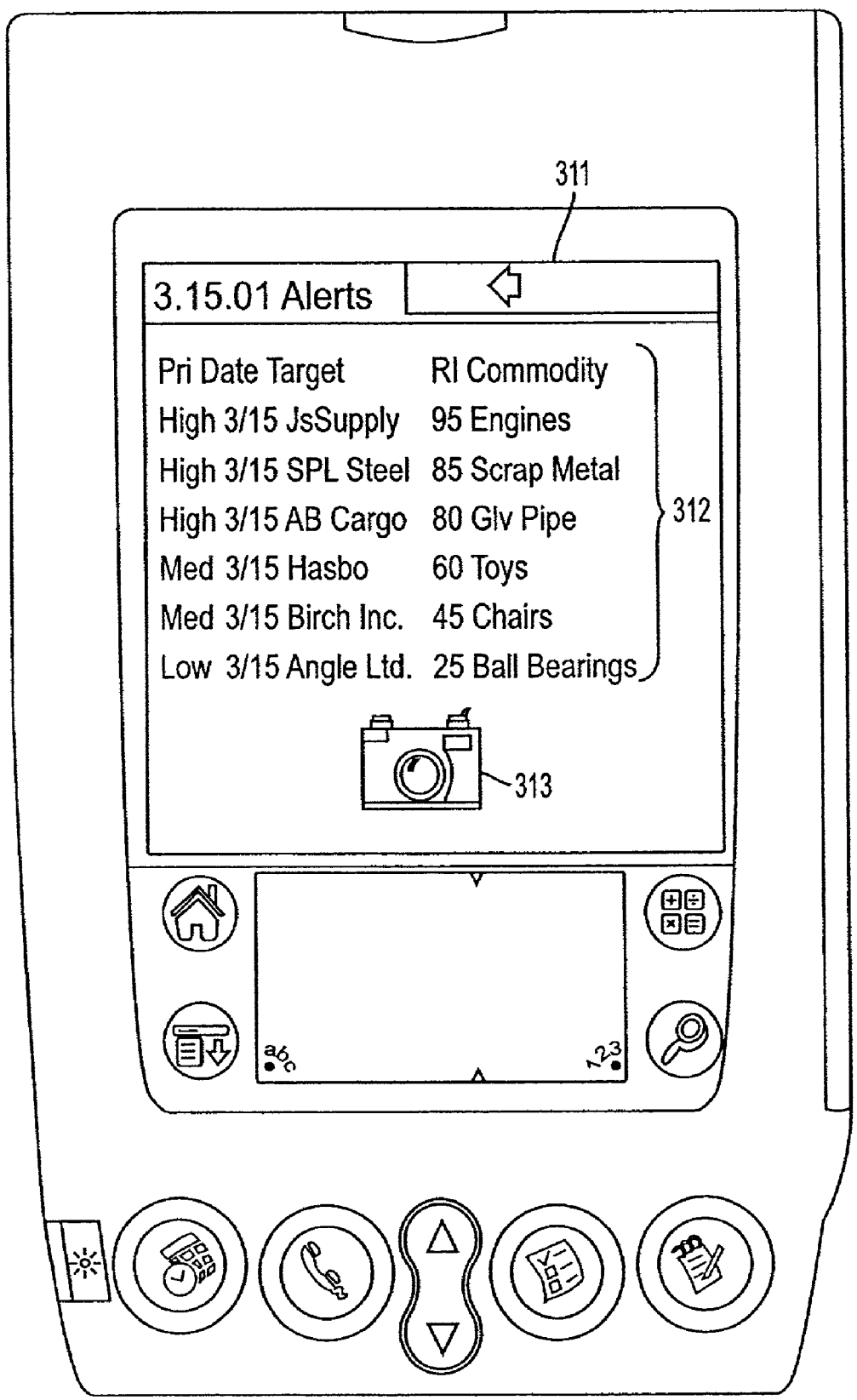
FIG. 6 illustrates a computer screen on a handheld device displaying an alert summary list according to one embodiment of the invention.

When the inspector selects the alerts link 303 (e.g., by touching the portable device's touch sensitive screen), the portable device may display an alerts screen 311, shown in FIG. 6. The alerts screen 311 may contain an alerts summary list 312, which may be the same information as is available under the alerts tab in the conventional computer embodiment described above. Optionally, an image link 313 may also be included on the alerts screen. After selecting an alert, the inspector may select the image link to either view a digital image of the goods or to capture a digital image of the goods, depending on whether a digital image already exists in the alert record. If an image already exists, it may be displayed on the portable device display screen. If no image exists, the inspector may capture an image using an optionally attached digital camera. An example of a digital camera that may be used is the EYEMODULE for use with HANDSPRING VISOR personal digital assistants. Other portable devices with integrated or externally attached cameras may also be used.

Figure 7:
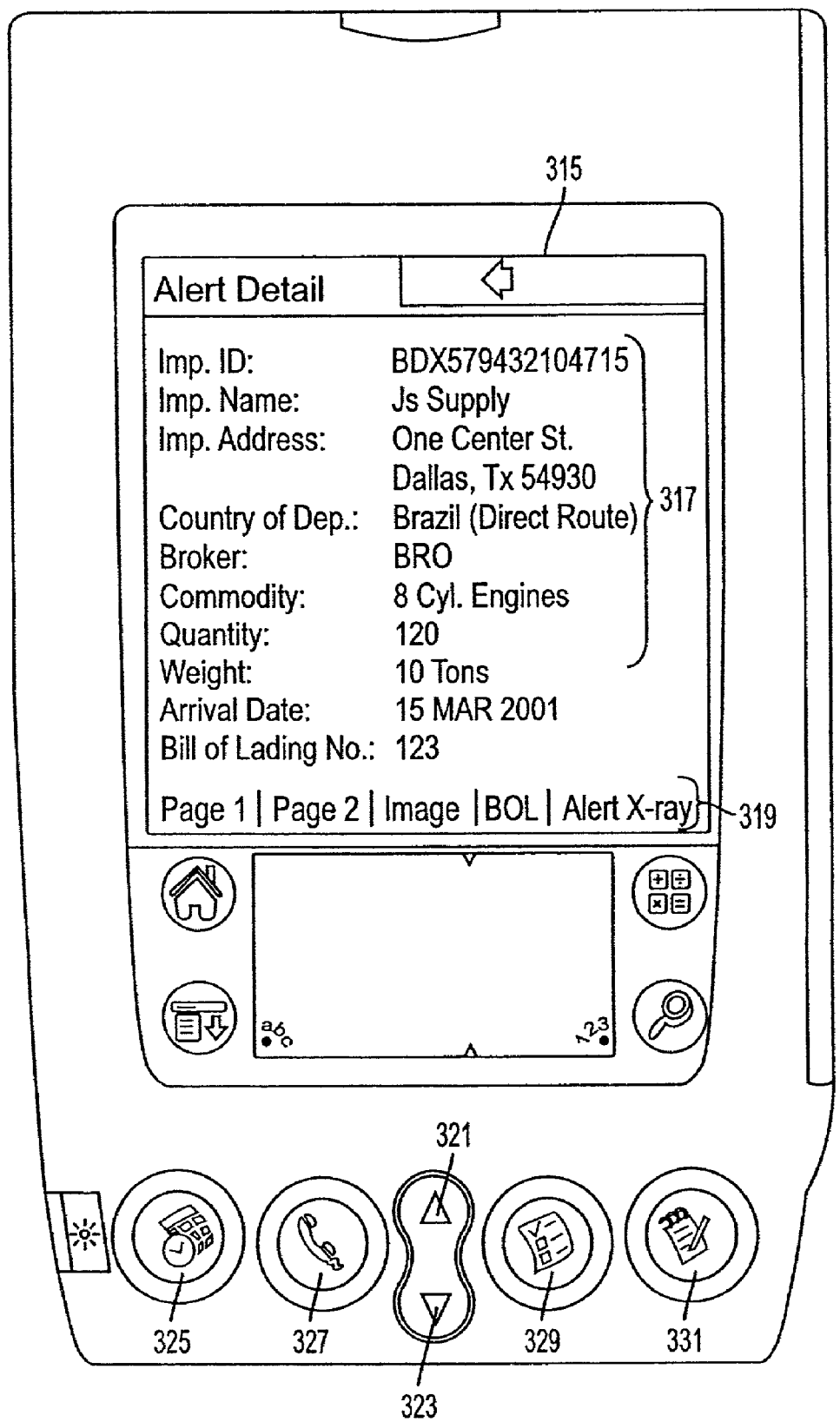
FIG. 7 illustrates a computer screen on a handheld device displaying alert detail information according to one embodiment of the invention.
Figure 8:
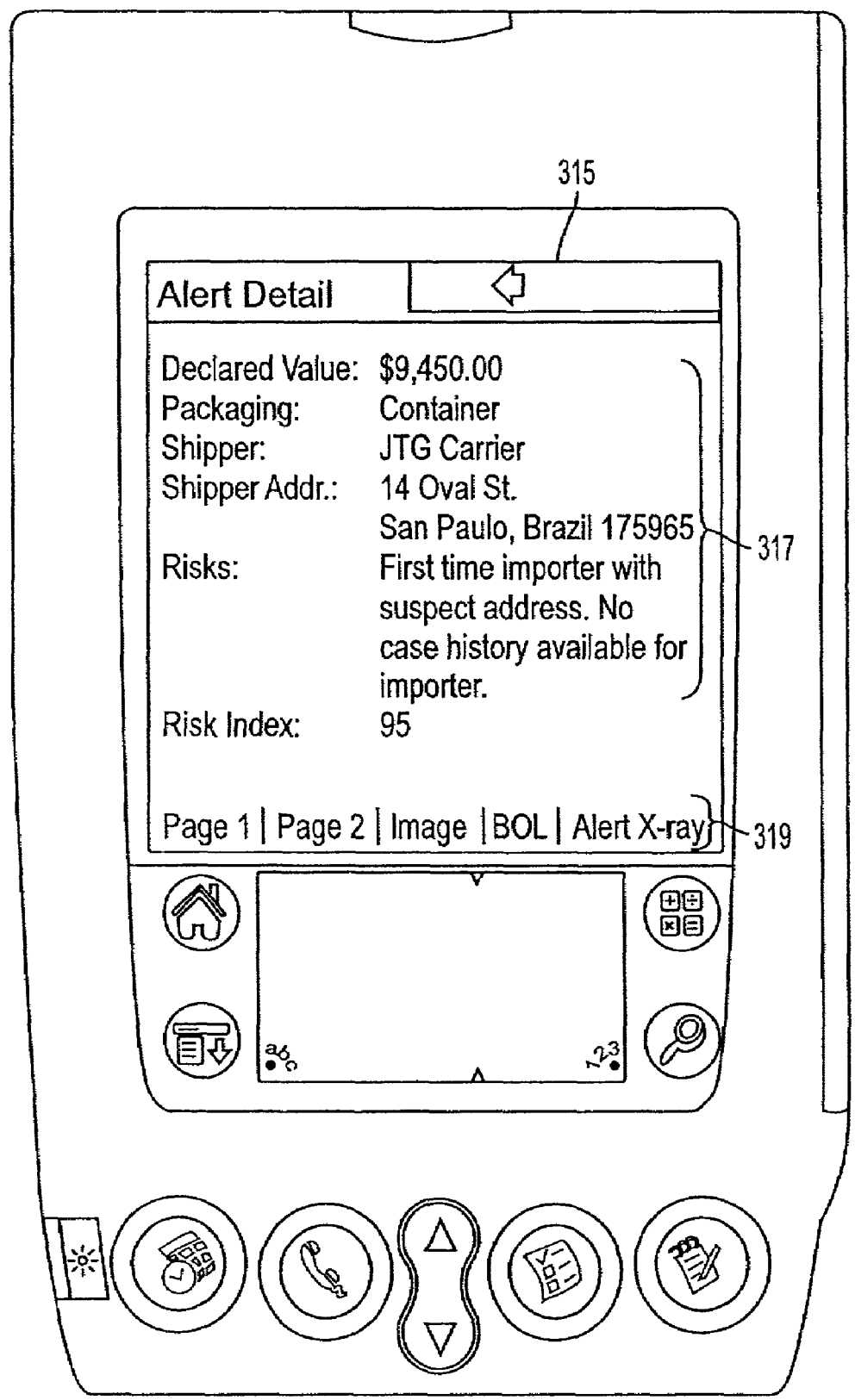
FIG. 8 illustrates a second computer screen on a handheld device displaying alert detail information according to one embodiment of the invention.

When the inspector selects an alert from the alert summary list 312 on the alert screen, the portable device may display the alert detail screen 315, shown in FIGS. 7 and 8. Due to size limitations of some portable devices, alert information may be displayed on two or more alert detail screens. FIG. 7 shows page 1 of an alert detail screen for a selected alert. FIG. 8 shows page 2 of an alert detail screen for the same selected alert. Each alert detail screen 315 may include an information section 317 and a navigation section 319. The information sections among the various alert detail screens relating to the same alert may contain the same information as is available under the alert detail tab in the first embodiment described above.

The navigation section 319 provides links to the various pages of alert detail information, a link to an image of the goods when available, a link to the bill of lading, and a link to alert the X-ray team as in the first embodiment. In addition to using the links in the navigation section 319, an inspector may optionally move from page to page using navigation buttons on a portable device, such as up and down buttons 321 and 323, respectively. Other known navigation and interface techniques on portable devices may also be used.

When the inspector selects the "image" link in the navigation section 319, the portable device may behave the same as if the inspector selected the image link 313 from the alerts screen 311 in FIG. 6, by displaying the image when present or storing an image using an attached camera. When the inspector selects the "BOL" link, the portable device may display the bill of lading for the shipment of goods to which the alert relates. When the inspector selects the Alert X-Ray link, the portable device may display an instant messaging or email screen through which the inspector may enter additional comments or other information, and transmit a message to a computing device associated with the X-ray team, as in the first embodiment described above. Alternatively, the device may send a message to the X-ray team computer without accepting additional information from the inspector. That is, when the inspector selects the alert X-ray link, a message may be automatically transmitted to the X-ray team. The inspector may return to the alert summary list 312 by selecting an optionally displayable link (not shown), by pressing one of the portable devices programmable buttons 325, 327, 329, and 331, or any other suitable user interface technique, now know or later developed.

Figure 9:
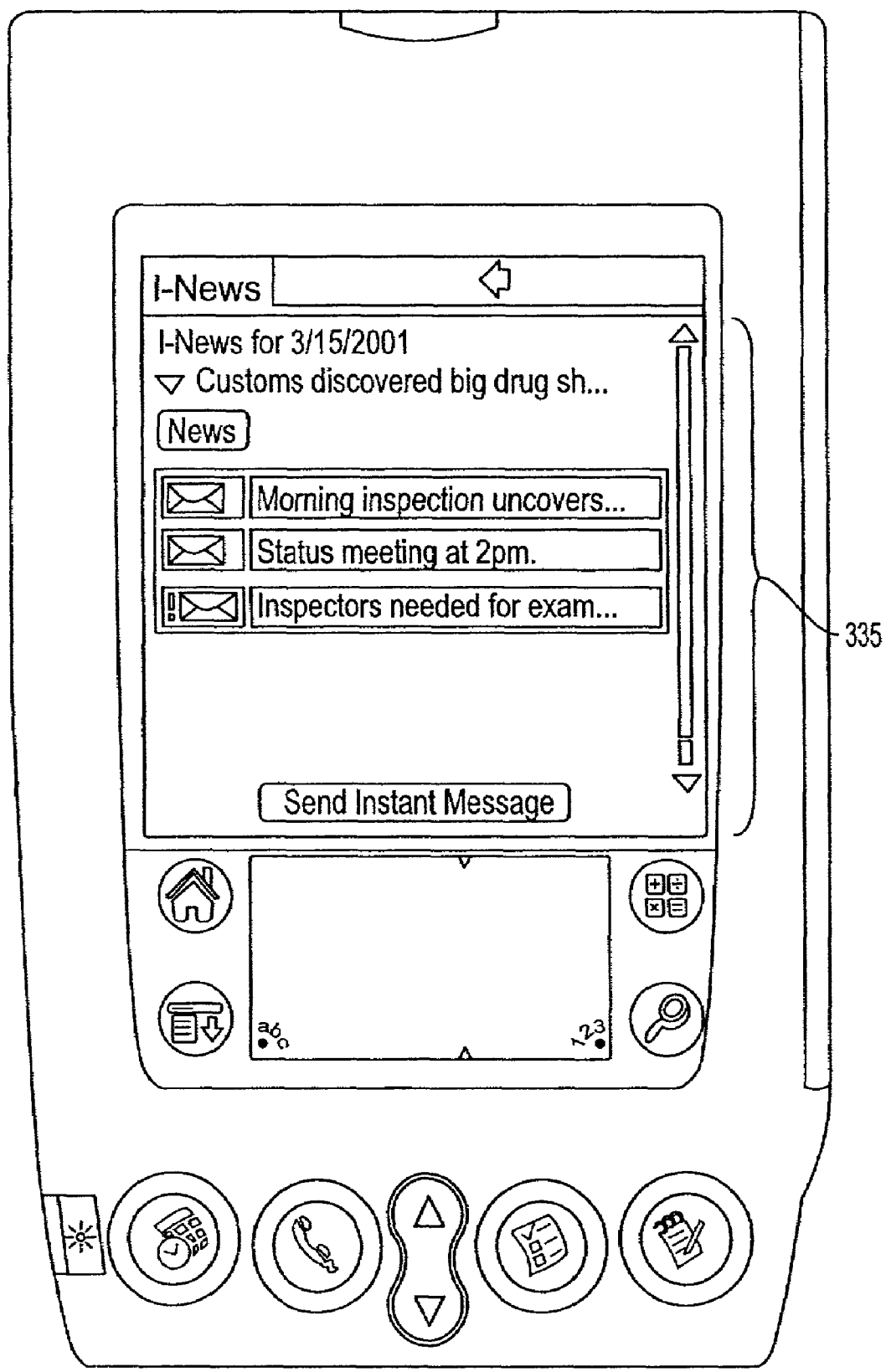
FIG. 9 illustrates a computer screen on a handheld device displaying news information according to one embodiment of the invention.

When the inspector selects the news link 309 from the welcome screen (FIG. 5), the portable device may display the news screen 335, shown in FIG. 9. The news screen 335 may contain USCS news articles, instant messages, and the like, similar to or the same as the news section in the first embodiment described above. The news screen 335 may also contain email messages and allow the inspector to send email and/or instant messages to other USCS personnel. For instance, an inspector, upon inspecting the shipment of 8-cylinder engines referred to in FIGS. 7-8, determines that there are drugs hidden in the engine block. The inspector may then send an email, instant message, or other like communication, to one or more other inspectors or other USCS personnel to inform them to carefully check any incoming engines for possible illegal drugs, especially 8-cylinder engines originating in Brazil. Alternatively, the inspector may send an instant message to the appropriate personnel informing them of the illegal drugs so that that person can flag every incoming shipment of engines to ensure that each shipment may be searched before entry into the country.

In addition, there may optionally be an image link (not shown) on the email and/or instant message screen. When entering an email or instant message, the inspector may select the image link to capture an image using the optionally attached camera. The image may then be attached to and sent with the email or instant message to the desired recipient(s). This may eliminate the need for an import specialist to travel to a border location to determine the correct import classification of incoming goods because the import specialist may view the received image and make the classification decision without traveling to the goods' location. Email and/or instant messaging services may be served by the central computer 101 or a separate server (not shown) from the central computer 101, as is known in the art.

When the inspector selects the research link 307 (FIG. 5), the portable device may display a research screen (not shown). The research screen may contain links to the same resources as or different resources from those resources available in the research portion of the research area 205 in the PC embodiment described above.

As previously stated, the portable devices may be adapted with wireless communication capabilities to be in continuous communication with the central database. In another embodiment, the portable devices may not have wireless capabilities, but rather the devices may be synchronized, or hot-synched, with the central database using an application program residing on a conventional computer, as is known in the art. Any changes made in the portable device, and any email and instant message communications, would be updated and sent the next time the inspector connected the portable device to the computer and performed the synchronization process.

In yet another embodiment, the portable devices may be adapted with wireless communications and also perform synchronizations with a customs resources application residing on a conventional computer. After the inspector logs in using the conventional computer, the inspector may synchronize the portable device to the information downloaded to the conventional computer from the database. Later, after the inspector has performed an inspection, the portable device may wirelessly transmit the inspection results to the database, as described above.

Some embodiments of the invention may use the customs resource application as embodied in a conventional computer, while others may use the customs resource application as embodied in a portable device. Yet others may use the customs resource application both through a conventional computer and a portable device, allowing inspectors the option of typically larger display screens and the often more user-friendly interfaces available on a conventional computer, while allowing inspectors real-time access to information and the ability to clear shipments from the field using the portable device.

In some embodiments, each customs resource application screen may be unique to individual inspectors. That is, the inspector may select preferences for the information and resources that are displayed on each customs resource application screen, as well as which screen should be displayed as a default. Thus, one inspector's default screen may be a listing of alert summaries, such as is shown in FIG. 2, while another inspector's default screen may be an email screen (not shown). Also, one inspector may have a first set of resources displayed in the Research window, while another may have a second set of resources displayed in the Research window. Another preference that inspectors may define may affect the layout of the customs resource application screens, and where specified content should be displayed on the screen. It should be readily apparent to those skilled in the art that additional preferences may also be set within the customs resource application.

In both the first and second embodiments described above, various programming languages may be used, depending on the hardware configuration, to implement the various aspects of the invention. In one embodiment, PALM OS may be used to implement the customs resource application on a portable device such as a PALM VII or HANDSPRING VISOR, and Visual Basic and/or HTML, may be used to implement the customs resource application on a convention computer. Other programming languages may also be used, as known by those skilled in the art.

Figures 10, 11:
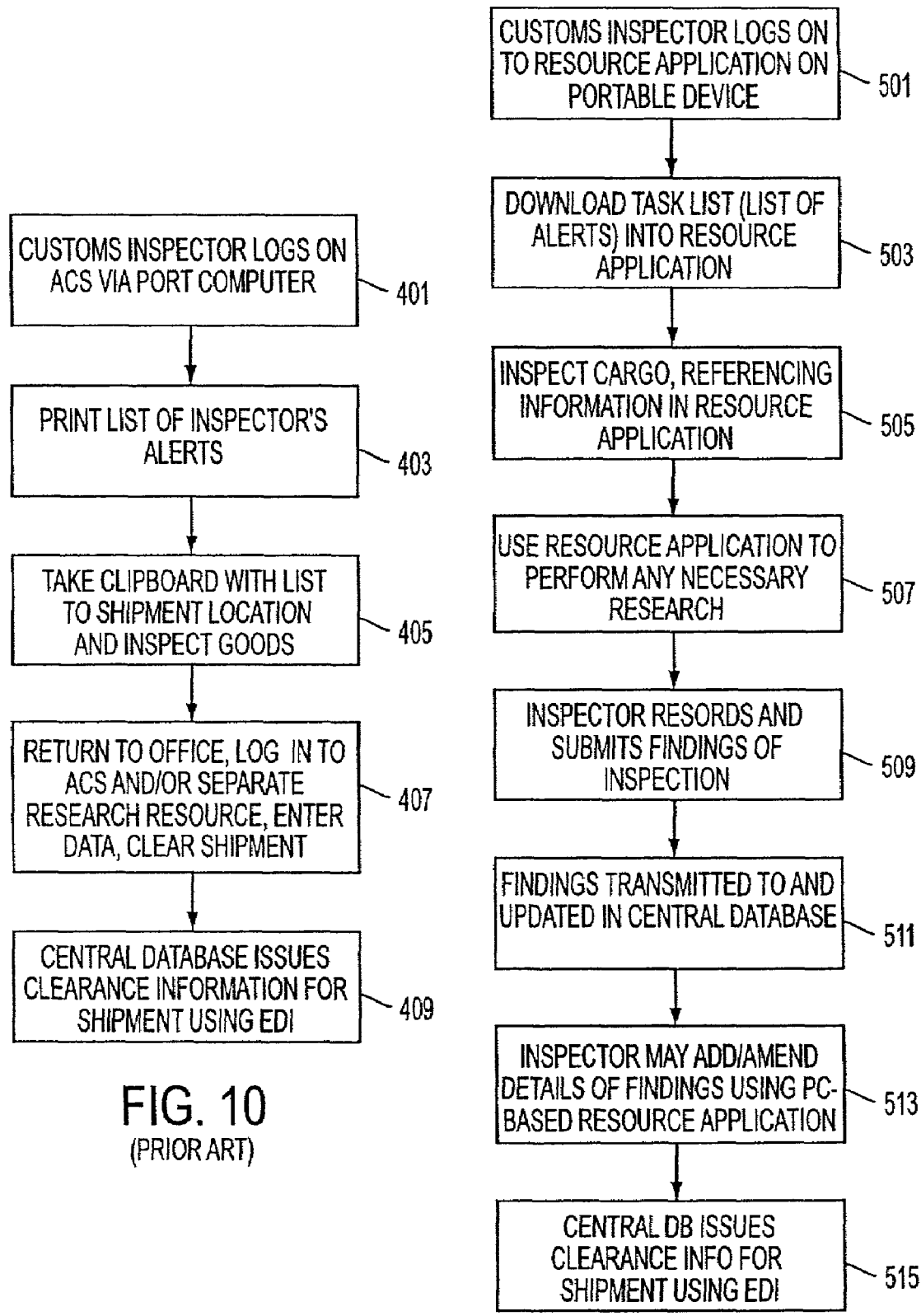
FIG. 10 illustrates a typical method used by the United States Customs Service to clear incoming shipments of goods into the U.S.
FIG. 11 illustrates a method of clearing incoming shipments of goods according to one embodiment of the invention.

With reference to FIG. 11, the above-described customs resource application may be used to perform an improved method of clearing shipments of goods through USCS for entry into the U.S., or by other countries' customs services. Beginning in step 501, an inspector may log in to the customs resource application using a portable device. The login procedure may comprise sending the inspector's login information via a wireless communications link to the database and verifying the inspector's login information. Alternatively, the portable device may log in to the database through a synchronization process while connected to a convention laptop or desktop computer, as is well known in the art.

In step 503, the portable device downloads the logged in inspector's task list to the device's memory. The inspector then may inspect the cargo, referencing information in the customs resource application using the portable device, in step 505. The inspector may use the portable device to reference alert detail information, send and/or receive email and/or instant messages from other USCS personnel, compare a previously taken digital image of the shipment to the actual shipment, and the like. The inspector may also perform any necessary research using the portable device in step 507. If no research is required, step 507 may be skipped. Upon completing the inspection, the inspector may record her findings in the portable device in step 509, which are transmitted to the central database in step 511. The inspector may add additional information or amend previously entered information using the portable device or a PC enabled with the customs resource application in optional step 513. Finally, in step 515, the central database issues clearance information for the shipment using EDI. Using the above-described method, customs inspectors have access to a variety of useful and timesaving resources via the customs resource application. In addition, when the inspector has finished the inspection, the inspector may instantly clear the shipment of goods for entry into the country, without requiring the inspector to return to the field office.

It should be appreciated that the above method steps are not meant to limit the order of the steps to that indicated. For instance, step 507 may be performed at any point after logging in to the customs resource application. Other steps may also be performed in other orders. Similarly, the inclusion of each of the above steps is not meant to indicate that the step is required. For instance, at least steps 507 and 513 are optional, depending on the shipment being inspected. It should also be readily apparent to those skilled in the art that the method may be adapted for use with the first embodiment, as well as with various portable devices.

With reference to FIG. 13, there is a method of clearing a shipment of goods into a country using a portable device. A portable device receives a task list in step 601. Each task may correspond to a shipment of goods for inspection or other action by a customs inspector. In step 603, the portable device displays the task information on a display screen, for a customs inspector's review. The portable device may receive inspection results from the customs inspector in step 605, after the inspector has completed his or her inspection of a shipment. The inspection results preferably correspond to one of the shipments of goods in the task list. Finally, in step 607, the portable device transmits the inspection results to a central computer and/or database.

With reference to FIG. 14, there is a method of supporting the clearing of a shipment of goods into a country by a central computer. In step 701, a central computer sends a task list to a portable device. Each task corresponds to a shipment of goods for inspection or other action by a customs inspector. In step 703, the central computer receives inspection results from the portable device. The inspection results should correspond to one of the shipments of goods from the sent task list. In step 705, the central computer clears a shipment of goods into the country based on the received inspection results.

Figure 15:
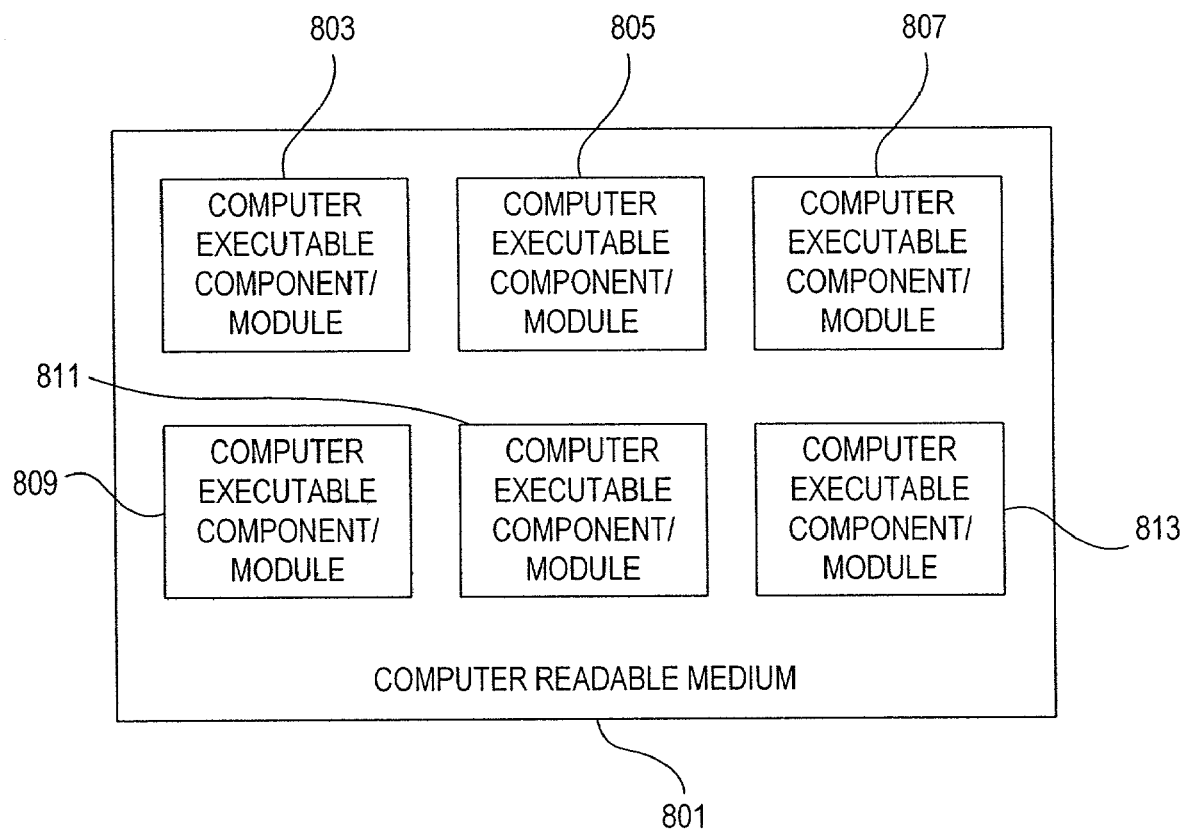
FIG. 15 illustrates a block diagram of a computer readable medium according to an embodiment of the invention.

The inventive method and system may be embodied as computer readable instructions stored on a computer readable medium such as a floppy disk 25, hard disk 21, or system memory 13. FIG. 15 illustrates a block diagram of a computer readable medium 701 that may be used in accordance with one or more of the above embodiments. The computer readable medium 801 stores computer executable components, or software modules, 803-813. More or fewer software modules may alternatively be used. Each component may be an executable program, a data link library, a configuration file, a database, a graphical image, a binary data file, a text data file, an object file, a source code file, or the like. When processor 11 executes one or more of the software modules, the software modules interact to cause the computer system 10 to perform according to the teachings of the present invention as described herein.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A portable device comprising:
   a display screen;
   a processing unit; and
   memory storing computer readable instructions that, when executed by the processor, cause the portable device to perform the steps of:
   (i) receiving a task list, wherein each task comprises information known about shipments of goods prior to the shipments being inspected;
   (ii) displaying task information on the display screen to inform a user about upcoming inspections;
   (iii) identifying a first shipment of goods to be inspected by the user based on the information known about shipments of goods;
   (iv) receiving inspection results from the user, wherein an on-site inspection of the first shipment of goods is performed by the user and the on-site inspection of goods is based from the information about the shipments of goods, further wherein the inspection results correspond to the user's on-site inspection of the first shipment of goods; and
   (v) transmitting the inspection results over a wireless communications link.

2. The portable device of claim 1, wherein step (i) is performed over a wireless communications link.

3. The portable device of claim 1, wherein step (i) is performed during one or more wired synchronization procedures.

4. The portable device of claim 1, wherein each task corresponds to a shipment of goods that is to be inspected.

5. The portable device of claim 1, further comprising a camera, and wherein the computer readable instructions further cause the portable device to perform the steps of:
   (vi) photographing at least a portion of the one shipment of goods using the camera;
   (vii) storing the photograph in the memory; and
   (viii) associating the photograph with the task corresponding to the one shipment of goods.

6. The portable device of claim 1, wherein the computer readable instructions further cause the device to perform the step of:
   (vi) sending a communication to a second device associated with an X-ray team, based on the inspection results, said communication requesting an x-ray of the corresponding shipment.

7. The portable device of claim 1, wherein the computer readable instructions further cause the device to perform the step of:
   (vi) sending a communication to a device associated with an import specialist, said communication comprising inspection results.

8. The portable device of claim 1, wherein the computer readable instructions further cause the device to perform the step of:
   (vi) sending a communication to at least one device associated with a customs inspector, said communication comprising inspection results.

9. The portable device of claim 1, wherein the computer readable instructions further cause the portable device to perform the steps of:
   (vi) displaying a research tool in response to a user input; and
   (vii) receiving research criteria input by the user;
   (viii) querying the research tool using the research criteria; and
   (ix) displaying query results on the display screen.

10. The portable device of claim 9, wherein the research tool displays news articles.

11. The portable device of claim 9, wherein the research tool comprises an inspection look up function.

12. The device of claim 1, wherein the computer readable instructions further cause the portable device to perform the step of: obtaining a risk rating related to the shipments of goods based on criteria from the group of: importer information, carrier information, type of merchandise, amount of times the carrier has been inspected, and amount of times contraband has been found for a particular carrier.

13. The device of claim 12, wherein the risk rating is used by the user during the inspection of one of the shipments of goods to identify shipments that are likely to contain illegal goods.

14. A computer, comprising:
a display screen;
a processing unit; and
memory storing computer readable instructions wherein, when the computer readable instructions are executed by the processor, they cause the computer to perform the steps of:
(i) receiving a task list from a second computer, wherein each task comprises information known about shipments of goods prior to the shipment being inspected;
(ii) displaying task information on the display screen to inform a user about upcoming inspections;
(iii) identifying a first shipment of goods to be inspected by the user based on the information known about shipments of goods;
(iv) receiving inspection results from the user, wherein an on-site inspection of the first shipment of goods is performed by the user and the on-site inspection of goods is based from the information about the shipments of goods, further wherein the inspection results correspond to the user's on-site inspection of the first shipment of goods; and
(v) sending the inspection results to the second computer.

15. The computer of claim 14, wherein each task corresponds to a shipment of goods that is to be inspected.

16. The computer of claim 14, further comprising a camera, and wherein the computer readable instructions further cause the computer to perform the steps of:
(v) photographing at least a portion of a first shipment of goods using the camera;
(vi) storing the photograph in the memory; and
(vii) associating the photograph with the task corresponding to the first shipment of goods.

17. The computer of claim 14, wherein the computer readable instructions further cause the computer to perform the step of:
(vi) sending a communication to a device associated with an X-ray team, based on the inspection results, said communication requesting an x-ray of the corresponding shipment.

18. The computer of claim 14, wherein the computer readable instructions further cause the computer to perform the step of:
(vi) sending a communication to a device associated with one of an import specialist and a customs inspector, based on the inspection results.

19. The computer of claim 18, wherein the communication is sent to a plurality of devices associated with customs inspectors.

20. The computer of claim 14, wherein the computer readable instructions further cause the computer to perform the steps of:
(vi) displaying a research tool in response to a user input; and
(vii) receiving research criteria input by the user;
(viii) querying the research tool using the research criteria; and
(ix) displaying query results on the display screen.

21. The computer of claim 20, wherein the research tool comprises an inspection look up function.

22. The computer of claim 20, wherein the research tool displays reports of trends of imported goods.

23. The computer of claim 14, wherein the computer readable instructions further cause the computer to perform the steps of: obtaining a risk rating related to the shipments of goods based on criteria from the group of: importer information, carrier information, type of merchandise, amount of times the carrier has been inspected, and amount of times contraband has been found for a particular carrier.

24. The computer of claim 23, wherein the risk rating is used by the user during the inspection of one of the shipments of goods to identify shipments that are likely to contain illegal goods.

25. A portable device comprising:
a display screen;
a processing unit; and
memory storing a database and computer readable instructions, wherein each entry in the database is representative of a task and comprises:
a first field representative of a priority level,
a second field representative of an arrival date,
a third field representative of an importer name,
a fourth field representative of a risk level, and
a fifth field representative of a commodity name; and
wherein the computer readable instructions, when executed by the processor, cause the portable device to perform the steps of:
(i) receiving a task list, wherein each task corresponds to a shipment of goods and wherein the priority level, the arrival date, the importer name, the risk level, and the commodity name is used by a user to prioritize an inspection schedule;
(ii) displaying a task summary list on the display screen to inform a user about upcoming inspections, wherein the task summary list is ordered based on the priority level, the arrival date, the importer name, the risk level, and the commodity name;
(iii) displaying detailed task information on the display screen, wherein the detailed task information comprises information associated with a shipment of goods corresponding to a selected task, said information comprising information known about the shipment of goods prior to the shipment being shipped;
(iv) receiving inspection results from the user, wherein an on-site inspection of one of the shipments of goods in the task list is performed by the user and the on-site inspection of goods is based from the information about the shipment of goods, farther wherein the inspection results correspond to the shipment of goods; and
(v) transmitting the inspection results.

26. The portable device of claim 25, wherein step (i) is performed over one of a synchronization process through a second computer and a wireless communications link.

27. The portable device of claim 25, wherein the task summary list comprises the priority level, the arrival date, the importer name, the risk level, and the commodity name for each task.

28. The portable device of claim 25, wherein in step (v), the results are transmitted over a wireless communications link.

29. The device of claim 25, wherein the computer readable instructions further cause the portable device to perform the step of: obtaining a risk rating related to the shipment of goods based on criteria from the group of: importer information, carrier information, type of merchandise, amount of times the carrier has been inspected, and amount of times contraband has been found for a particular carrier.

30. The device of claim 29, wherein the risk rating is used by the user during the inspection of one of the shipments of goods to identify shipments that are likely to contain illegal goods.

31. A computer, comprising:
　a display screen;
　a processing unit; and
　memory storing a database and computer readable instructions, wherein each entry in the database is representative of a task and comprises:
　　a first field representative of a priority level,
　　a second field representative of an arrival date,
　　a third field representative of an importer name,
　　a fourth field representative of a risk level, and
　　a fifth field representative of a commodity name;
and wherein the computer readable instructions, when executed by the processor, cause the computer to perform the steps of:
　(i) receiving a list of tasks from a central database, wherein each task corresponds to a shipment of goods, and wherein each task comprises information known about the shipment of goods prior to the shipment being shipped, and further wherein the priority level, the arrival date, the importer name, the risk level, and the commodity name is used by a user to prioritize an inspection schedule;
　(ii) displaying a task list on the display screen to inform a user about upcoming inspections, wherein, for each task, the computer displays the priority level, the arrival date, the importer name, the risk level, and the commodity name, and wherein the task summary list is ordered based on the priority level, the arrival date, the importer name, the risk level, and the commodity name;
　(iii) displaying task information on the display screen, wherein the detailed task information comprises information associated with a shipment of goods corresponding to a selected task;
　(iv) receiving inspection results from the user, wherein an on-site inspection of one of the shipments of goods in the task list is performed by the user and the on-site inspection of goods is based from the information about the shipment of goods, further wherein the inspection results correspond to the shipment of goods; and
　(v) transmitting the inspection results and clearing the shipment for passage.

32. The computer of claim 31, wherein the computer readable instructions further cause the computer to perform the step of:
　(vi) displaying an analysis report list on the display screen, wherein, when a user selects one of the analysis reports, a complete report corresponding to the selected report is displayed on the display screen.

33. The computer of claim 31, wherein the computer readable instructions further cause the computer to perform the step of:
　(vi) displaying an inspection look up box on the display screen, wherein, when a user enters a selected date, a list of inspections corresponding to that date is displayed on the display screen.

34. The computer of claim 31, wherein the computer readable instructions further cause the computer to perform the step of: obtaining a risk rating related to the shipment of goods based on criteria from the group of: importer information, carrier information, type of merchandise, amount of times the carrier has been inspected, and amount of times contraband has been found for a particular carrier.

35. The computer of claim 34, wherein the risk rating is used by the user during the inspection of one of the shipments of goods to identify shipments that are likely to contain illegal goods.

36. A method of clearing a shipment of goods into a country, comprising the steps of:
　(i) receiving at a portable handheld computer a task list comprising a plurality of tasks, wherein each task comprises information known about shipments of goods received at a customs border prior to the shipments being inspected;
　(ii) displaying the task list on a display of the portable handheld computer to inform a user about upcoming inspections;
　(iii) receiving user input selecting a first task from a plurality of tasks in the task list;
　(iv) displaying task detail information corresponding to the first task to inform the user about upcoming inspections;
　(v) identifying one of the shipments of goods corresponding to the first task;
　(vi) inspecting on-site the one of the shipments of goods, wherein an on-site inspection of the one of the shipments of goods in the task list is performed by the user and the on-site inspection of the one of the shipments of goods is based from the information about the shipments of goods;
　(vii) at a location of goods being inspected, receiving user input into the portable handheld computer corresponding to the user's inspection of the shipment of goods corresponding to the first task; and
　(viii) sending the inspection results from the portable handheld computer to a server computer, wherein the inspection results are sent over a wireless communications link.

37. The method of claim 36, wherein step (i) is performed over a wireless communications link.

38. The method of claim 37, wherein the portable handheld computer communicates with a camera, and further comprising the steps of:
　(ix) photographing at least a portion of the shipment of goods using a camera;
　(x) storing the photograph in a memory; and
　(xi) associating the photograph with the shipment of goods.

39. The method of claim 36, wherein the information known about shipments of goods includes an image of how the goods are expected to look upon inspection.

40. The method of claim 36, further comprising the step of:
　(ix) sending a communication to a device associated with an X-ray team based on the inspection results.

41. The method of claim 36, further comprising the step of:
　(ix) sending a communication to a device associated with an import specialist based on the inspection results.

42. The method of claim 36, further comprising the step of:
　(ix) sending a communication to at least one device associated with a customs inspector.

43. The method of claim 36, further comprising the steps of:
　(ix) accessing a research tool from the portable handheld computer; and (x) performing research corresponding to the shipment of goods.

44. The method of claim 43, wherein the research tool comprises reports of trends of imported goods.

45. The method of claim 43, wherein the research tool comprises an inspection lookup function.

46. The method of claim 36, wherein the method further includes the step of obtaining a risk rating related to the shipments of goods based on criteria from the group of: importer information, carrier information, type of merchandise, amount of times the carrier has been inspected, and amount of times contraband has been found for a particular carrier.

47. The device of claim 46, wherein the risk rating is used by the user during the inspection of one of the shipments of goods to identify shipments that are likely to contain illegal goods.

* * * * *